US008756626B2

(12) United States Patent
Strasser

(10) Patent No.: US 8,756,626 B2
(45) Date of Patent: Jun. 17, 2014

(54) METHOD AND APPARATUS FOR USING THE HOST-POD INTERFACE OF A DIGITAL TELEVISION OR OTHER DIGITAL AUDIO/VIDEO RECEIVER FOR NEW SERVICES

(75) Inventor: David A. Strasser, Toronto (CA)

(73) Assignee: Broadcom Corporation, Irvine, CA (US)

( * ) Notice: Subject to any disclaimer, the term of this patent is extended or adjusted under 35 U.S.C. 154(b) by 1681 days.

(21) Appl. No.: 11/306,317

(22) Filed: Dec. 22, 2005

(65) Prior Publication Data

US 2007/0146542 A1 Jun. 28, 2007

(51) Int. Cl.
H04N 7/167 (2011.01)
H04N 7/16 (2011.01)
H04N 7/173 (2011.01)
G06F 15/16 (2006.01)
H04N 21/43 (2011.01)
H04N 21/418 (2011.01)
H04N 21/4623 (2011.01)
H04N 21/462 (2011.01)
H04N 21/4143 (2011.01)
H04N 21/4405 (2011.01)
H04N 21/4402 (2011.01)

(52) U.S. Cl.
CPC ....... *H04N 21/4623* (2013.01); *H04N 21/4305* (2013.01); *H04N 21/4183* (2013.01); *H04N 21/4181* (2013.01); *H04N 21/4621* (2013.01); *H04N 21/4143* (2013.01); *H04N 21/418* (2013.01); *H04N 21/4405* (2013.01); *H04N 21/440218* (2013.01)
USPC ............... 725/31; 725/25; 725/127; 725/131; 725/132; 725/151; 709/246; 709/247

(58) Field of Classification Search
CPC ............ H04N 21/418; H04N 21/4181; H04N 21/262; H04N 21/266; H04N 21/4623; H04H 60/14
See application file for complete search history.

(56) References Cited

U.S. PATENT DOCUMENTS 5,619,250 A * 4/1997 McClellan et al. ............ 725/132
6,963,590 B1 * 11/2005 Mann et al. .................... 370/535

(Continued)

FOREIGN PATENT DOCUMENTS

FR 2 848 043 6/2004
WO WO 01/74075 * 10/2001 ............. H04N 7/167
WO WO 2005/029849 A1 3/2005
WO WO 2005/072389 * 8/2005

OTHER PUBLICATIONS

J.R. Smith et al., "Transcoding Internet Content for Heterogenous Client Devices", ISCAS, May 1998.*

(Continued)

*Primary Examiner* — Nathan Flynn
*Assistant Examiner* — James R Marandi
(74) *Attorney, Agent, or Firm* — Foley & Lardner LLP; Christopher J. McKenna

(57) ABSTRACT

To receive new services including audio or video content for presentation by a cable-compatible digital television or other digital audio/video receiver, a module may be connected to the HOST-POD interface of the digital television. The module has a receiver for receiving audio or video content in a first compression format, a transcoder for converting said audio or video content from the first compression format into a second, different compression format, and a controller for transmitting the audio or visual content in the second compression format to the digital television over a HOST-POD interface. By using such a module, front-end components of the digital television may be bypassed while back-end components may be utilized to decompress and present the content. The module may be a PC card or smart card for example.

25 Claims, 5 Drawing Sheets

(56) References Cited

U.S. PATENT DOCUMENTS

| | | | |
|---|---|---|---|
| 2002/0131496 A1* | 9/2002 | Vasudevan et al. | 375/240.11 |
| 2002/0157115 A1 | 10/2002 | Lu | |
| 2004/0226049 A1 | 11/2004 | Shiomi | |
| 2005/0102702 A1 | 5/2005 | Candelore et al. | |
| 2005/0175178 A1 | 8/2005 | Candelore et al. | |
| 2006/0053457 A1* | 3/2006 | Guenebaud | 725/100 |
| 2011/0083141 A1* | 4/2011 | Westberg et al. | 725/31 |

OTHER PUBLICATIONS

H. Newton, "Newton's Telecom Dictionalry", CMP Books, Feb. 2002.*

International Search Report of International Application No. PCT/IB2006/003814 filed Dec. 21, 2006.

* cited by examiner

METHOD AND APPARATUS FOR USING THE HOST-POD INTERFACE OF A DIGITAL TELEVISION OR OTHER DIGITAL AUDIO/VIDEO RECEIVER FOR NEW SERVICES

FIELD OF THE INVENTION

The present invention relates to digital audio/video receivers such as digital televisions (DTVs), and more particularly to using the HOST-POD interface of such a digital audio/video receiver for new services.

BACKGROUND OF THE INVENTION

In the United States, the Telecommunications Acts of 1992 and 1996 require that cable subscribers be given the option of owning the equipment required to receive cable services. To support competition in the market for so-called "host" devices (i.e. DTV receivers such as set-top boxes or integrated digital televisions), a Report and Order of the U.S. Federal Communications Commission (FCC) adopted on Sep. 10, 2003 and released on Oct. 9, 2003 entitled "Second Report and Order and Second Further Notice of Proposed Rulemaking" (referred to as the "Digital Cable Plug and Play Report and Order"), which is available at World Wide Web address hraunfoss.fcc.gov/edocs_public/attachmatch/FCC-03-225A1.pdf and is hereby incorporated by reference hereinto, requires that cable operators make available security modules which are separable from host devices.

To satisfy the government's separable security requirements and to enable retail availability of host devices, point-of-deployment (POD) modules have been developed. A POD module (also known as a "POD security module" or simply a "POD") is a hardware device (with embedded firmware) provided by a cable provider which is intended to be plugged into a host device (or simply "HOST") to facilitate the display of digital television programs that are otherwise protected by the cable provider's conditional access (CA) scrambling system. When a POD module is plugged into a host device designed to receive such a module, subscribers are able to view the secure digital video services and/or listen to audio services for which they have subscribed, which services may include premium subscription channels. POD modules are sometimes referred to by the trademark CableCARD™. Physically, a POD module may be a Personal Computer Memory Card International Association (PCMCIA) card or a smart card device, both of which are approximately the same size as a credit card (although PCMCIA cards are thicker than a credit card). PCMCIA card are now also referred to as PC Cards. Specifically, a PC Card is 85.00 millimeters (mm) long (±0.10 mm), 54.00 mm wide (±0.20 mm), and has a 68-pin connector (two rows of 34 pins). A smart card (based on ISO 7810) is 85.72 mm long and 54.03 mm wide. A smart card may have a either 6-pin connector comprising Vcc, reset, clock ground, Vpp, and I/O, or an 8-pin connector comprising Vcc, reset, clock, Reserved, ground, Vpp, I/O, and Reserved.

POD modules serve two functions. First, the POD module acts as a descrambler, allowing the cable provider to be assured that the host device at the subscriber premises is a secure device without which scrambled content will be unviewable. Second, the POD module acts as a translator between the possibly varying out-of-band (OOB) protocols used on different cable provider networks and a single protocol (described below) that is expected by the host device. In other words, by virtue of the POD translation, the host device is only required to understand a single protocol, regardless of the OOB protocol (s) that may be operative on the cable provider network to which the host device is connected. Thus in the event of switching between cable providers or moving between different geographical areas, a subscriber should be able to continue using the same host device, provided that a new POD module is obtained from the new cable provider and plugged into to the host device. As well, this arrangement permits a cable provider to upgrade its network head-end without having to replace numerous set-top boxes at subscriber premises. The cable operator need only provide replacement POD modules in the event of an upgrade.

In a typical arrangement, a cable provider receives programming from various sources at its head-end and assigns it to channels. As defined in the American Nation Standards Institute/Society of Cable Telecommunications Engineers (ANSI/SCTE) 40 2004 Digital Cable Network Interface Specification standard, each channel is a unique 6 megahertz (MHz) section of the cable provider's bandwidth which in turn carries either a modulated digital signal that has been encoded to the Forward Application Transport (FAT) channel format or a modulated analog signal that has been encoded to the National Television Systems Committee (NTSC) format. At present, the FAT channel format specifies the use of ANSI/SCTE 54 2004 Digital Video Service Multiplex and Transport System Standard for Cable Television standard as the transport stream layer protocol for the digital signal. They are available at www.scte.org/documents/pdf/ANSISCTE402004.pdf and www.scte.org/documents/pdf/ANSISCTE542004DVS241.pdf respectively and are each hereby incorporated by reference hereinto. The numerous 6 MHz channels are then transmitted over cables simultaneously to subscribers in the form of an analog radio frequency (RF) signal.

The ANSI/SCTE 54 2004 standard further specifies the use of the MPEG-2 standard for transport stream formatting and video compression and the Audio Codec-3 (AC-3) standard for audio compression. MPEG-2 is a well-known video compression and transport standard developed by the Motion Picture Experts Group of the International Standards Organization and International Electrotechnical Committee Joint Technical Committee 1 Subcommittee 29 (ISO/IEC JTC1 SC29). AC-3 is well-known audio compression standard developed in the Advanced Television Systems Committee (ATSC) A/52B Digital Audio Compression (AC-3) (E-AC3) Standard. AC-3 is also referred to a Dolby® Digital which is a trademark of Dolby Laboratories, Inc. The AC-3 standard is available at www.atsc.org/standards/a_52b.pdf and is hereby incorporated by reference hereinto.

At the host device, an RF signal is received by a tuner within the host device. Depending upon the television channel selected by the subscriber (e.g. via a handheld remote control device), the tuner isolates one of the 6 MHz channels comprising the received signal and converts it to a fixed lower frequency. The output of the tuner is an analog signal representative of the tuned channel. This is referred to as a Forward Application Transport (FAT) channel.

The FAT channel is presented to a Quadrature Amplitude Modulation (QAM) demodulator within the host device. As is known in the art, a QAM demodulator converts the analog FAT channel to a baseband ANSI/SCTE 54 transport stream, which is a stream of (digital) packets. A subset of the packets of this stream represent the program content that is to be viewed by the subscriber (with the remaining packets consisting of control packets, "metadata" packets containing information about the network, and possibly other program content, as will be described).

In order to prevent unauthorized viewing of subscription channels, programs transmitted by way of ANSI/SCTE 54 transport streams are typically scrambled by the cable provider using a conditional access scrambling system. This is typically done for all but basic tier cable channels. The term "scrambling" is a legacy term which historically describes a technique developed in the 1970s whereby an analog cable television channel was reduced to a jumbled set of video images through removal of a synchronization signal or insertion of an interfering signal at the network head-end. In the digital ANSI/SCTE 54 transport stream, it is more accurate to refer to a program as being "encrypted" rather than "scrambled", since digital encryption techniques (not the above-described approach) are now employed to encrypt packets. However, the term "scrambled" is still commonly used to refer to this network head-end encryption, and the term "descramble" is still used to describe decryption of this encrypted program.

An ANSI/SCTE 54 transport stream having scrambled content is forwarded to the POD module via the "HOST-POD interface." The HOST-POD interface is also known as the CableCARD™-HOST interface. The HOST-POD interface is an interface governed by a standard known as the ANSI/SCTE 28 2004 HOST-POD Interface Standard. This standard defines the physical interface, signal timing, link interface and application interface of the HOST-POD interconnection (i.e. the interconnection between the POD module and the host device). The ANSI/SCTE 28 2004 HOST-POD Interface Standard is available at www.scte.org/documents/pdf/ANSISCTE282004.pdf, and is hereby incorporated by reference hereinto.

Assuming that a POD module is plugged into the HOST-POD interface of host device, the ANSI/SCTE 54 transport stream output by the QAM demodulator will be received at the POD module. At the POD module, two steps are performed. First, the scrambled program within the ANSI/SCTE 54 transport stream received from the host device is descrambled (i.e. decrypted). Second, the content is "copy protection" (CP+) re-encrypted and is provided back to the host device over the HOST-POD interface. The purpose of this re-encryption is to avoid unencrypted content from being transmitted, and possibly intercepted or copied, between the POD module and the host device. Re-encryption may be performed using the Data Encryption Standard (DES). DES is a method of data encryption which uses a private (secret) key that must be known and used by both the sender and the receiver of the data. DES is defined in the withdrawn U.S. National Institute of Standards and Technology (NIST) Federal Information Processing Standards (FIPS) Publication 46-3 (Electronic Code Book mode of operation). It is available at csrc.nist.gov/publications/fips/fips46-3/fips46-3.pdf and is hereby incorporated by reference hereinto. Packets representing minor channels that are not currently being viewed are passed from the POD module back to the host device unaltered.

At the host device, the CP+ encrypted ANSI/SCTE 54 transport stream is received at a transport demultiplexer. Using the appropriate key, the transport stream is decrypted, and elementary audio and video streams of the tuned channel are extracted and forwarded to audio and MPEG-2 video decoders, still in compressed form. The audio and MPEG-2 video decoders decompress the streams. Once decompressed, audio samples may be forwarded to an audio enhancement processor, which can enhance the samples in various ways, e.g. by applying Dolby Virtual Speaker™ technology, surround sound technology, or by performing sample rate conversion, before the samples are ultimately converted to sound by speakers. Dolby® Virtual Speaker™ technology is a trademark of Dolby Laboratories, Inc. Decompressed video frames, on the other hand, may be forwarded to a video and graphics post-processor, which can process the video frames/fields in various ways, e.g. by performing color management and contrast control, before they are ultimately displayed as images on a screen. For certainty, "video" refers to the program being watched, while "graphics" refers to, e.g., closed captioning, which is blended into the video.

In addition to stipulating that cable-compatible DTVs are to have a HOST-POD interface, the Digital Cable Plug and Play Report and Order also stipulates that cable-compatible DTVs are to have Digital Visual Interface (DVI) or High Definition Multimedia Interface (HDMI™) connectors, e.g. on the rear panel of the DTV device. The term HDMI™ is trademarked by HDMI Licensing, LLC. The purpose of these connectors is to permit devices that generate digital audio/video signals, such as Digital Versatile Disc (DVD) players for example, to be connected to the DTV, for purposes of presenting the generated digital audio/video signals at the DTV without any need for digital-to-analog (D/A) conversion (which could result in image and/or sound quality degradation). The United States government is increasing the percentage of televisions through government mandates such as the FCC's Digital Cable Plug and Play Report and Order. In order to be labelled as "Digital Cable Ready", a television will be required to have such interfaces over the coming years. Ultimately, each DTV will have either a DVI connector or an HDMI™ connector. For clarity, the term "DVI/HDMI™ connector" is used herein to refer to either one of these types of connectors.

In a DTV having a DVI/HDMI™ connector, the received signal is an uncompressed video signal, in accordance with the DVI and/or HDMI™ specifications. Signals carried over the HDMI™ connector can also transport uncompressed or compressed audio signals while simultaneously transporting uncompressed video signals. The DVI specification was developed by Digital Display Working Group and can be found at ddwg.org/lib/dvi_10.pdf. The HDMI™ specification is developed by the HMDI Licensing, LLC and can be found at www.hdmi.org/manufacturer/specification.asp. Accordingly, the received digital audio/video signals bypass the above-described audio and video decoders, which perform decompression, as well as the transport demultiplexer. Instead, the digital audio and video signals received at the DVI/HDMI™ connector may be communicated directly to the audio decoder (in the case of compressed audio) or audio enhancement processor (for uncompressed audio), while digital video signals are communicated directly to the video and graphics post-processor, respectively.

If an enterprise other than a cable provider, such as a telecommunications service provider, is desirous of providing new services (e.g., new audio and/or visual content) for presentation at a cable compatible DTV having a DVI/HDMI™ connector, that enterprise faces a dilemma. On one hand, if it is desired for the new service to be received at the DVI/HDMI™ connector, it would be necessary to transmit the relevant video signals in an uncompressed state, which would disadvantageously consume large amounts of bandwidth and therefore limit the amount of content which could be provided. On the other hand, if it is desired for the new service to be received at the existing cable input to the DTV device, this may be technologically infeasible because the modulation, and tuning schemes of the enterprise may be incompatible with those of the cable provider and because the physical medium of the enterprise may be something other than a coaxial cable.

A provider of new services could develop a standalone set-top box which decompresses new programming and sends it to the DTV in uncompressed form via a DVI/HDMI™ connector for display. However a dedicated set-top box is expensive to develop and disadvantageously introduces yet another device into the large set of audio/video components that may already exist in the typical home.

SUMMARY OF THE INVENTION

To receive new services including audio or video content for presentation by a cable-compatible digital television or other digital audio/video receiver, a module may be connected to the HOST-POD interface of the digital television. The module has a receiver for receiving audio or video content in a first compression format, a transcoder for converting said audio or video content from the first compression format into a second, different compression format, and a controller for transmitting the audio or visual content in the second compression format to the digital television over a HOST-POD interface. By using such a module, front-end components of the digital television may be bypassed while back-end components may be utilized to decompress and present the content. The module may be a PC card or smart card for example.

In accordance with an aspect of the present invention there is provided a module comprising a receiver for receiving a signal carrying audio or video content in a first compression format; a transcoder for converting said audio or video content from the first compression format to a second compression format different from the first format; and a controller for transmitting the audio or video content in the second compression format to a digital television via a HOST-POD interface.

In accordance with another aspect of the present invention there is provided a digital audio/video receiver comprising a tuner for receiving a digital cable television network or digital terrestrial broadcast signal; a HOST-POD interface, for connecting a module to the digital audio/video receiver; and a module, connected to the HOST-POD interface, the module comprising a receiver for receiving a signal carrying audio or video content in a first compression format from a source independent of the cable television network or terrestrial broadcast signal; a transcoder for converting the audio or video content from the first compression format to a second compression format different from the first format; and a controller for transmitting said audio or video content in the second compression format over the HOST-POD interface.

In accordance with yet another aspect of the present invention there is provided a method comprising at a module which is connected to a digital television at a HOST-POD interface: receiving audio or video content in a first compression format; converting the audio or video content from the first compression format to a second compression format different from the first format; and transmitting the audio or video content in the second compression format to the digital television via the HOST-POD interface.

In accordance with still another aspect of the present invention there is provided a module comprising: a receiver for receiving a signal carrying audio content in a first audio compression format and video content in a first video compression format; a demultiplexer for separating the audio content from the video content; an audio transcoder for converting the audio content from the first audio compression format to a second audio compression format; a video transcoder for converting the video content from the first video compression format to a second video compression format; a multiplexer for multiplexing the audio content in the second audio compression format and the video content in the second video compression format, the multiplexing resulting in a multiplexed stream; and a controller for transmitting the multiplexed stream to a digital audio/video receiver via a HOST-POD interface.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1A:
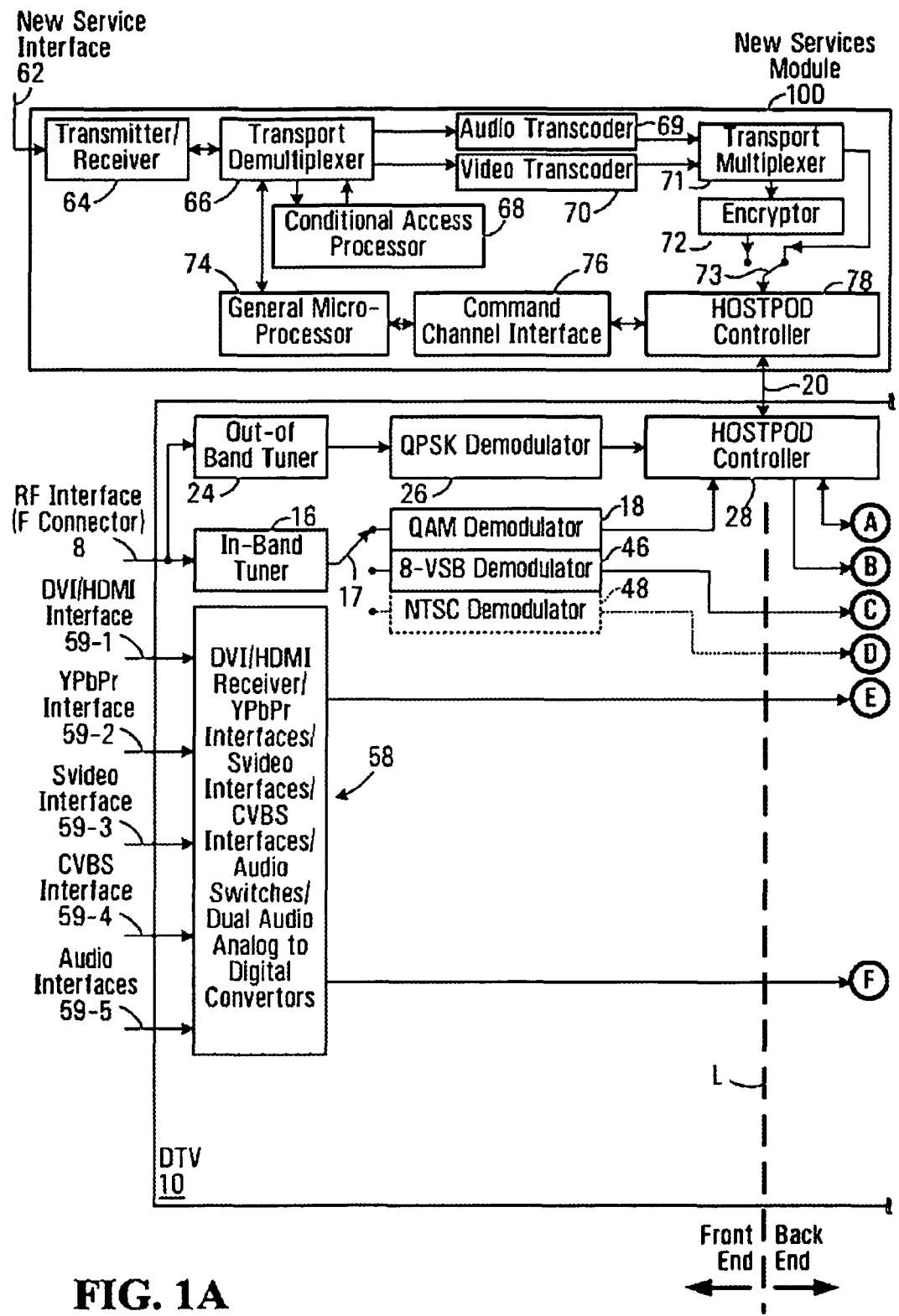
FIGS. 1A and 1B are schematic diagrams illustrating a digital television and interconnected new services module configured to receive new services (e.g. new programming)
Figure 1B:
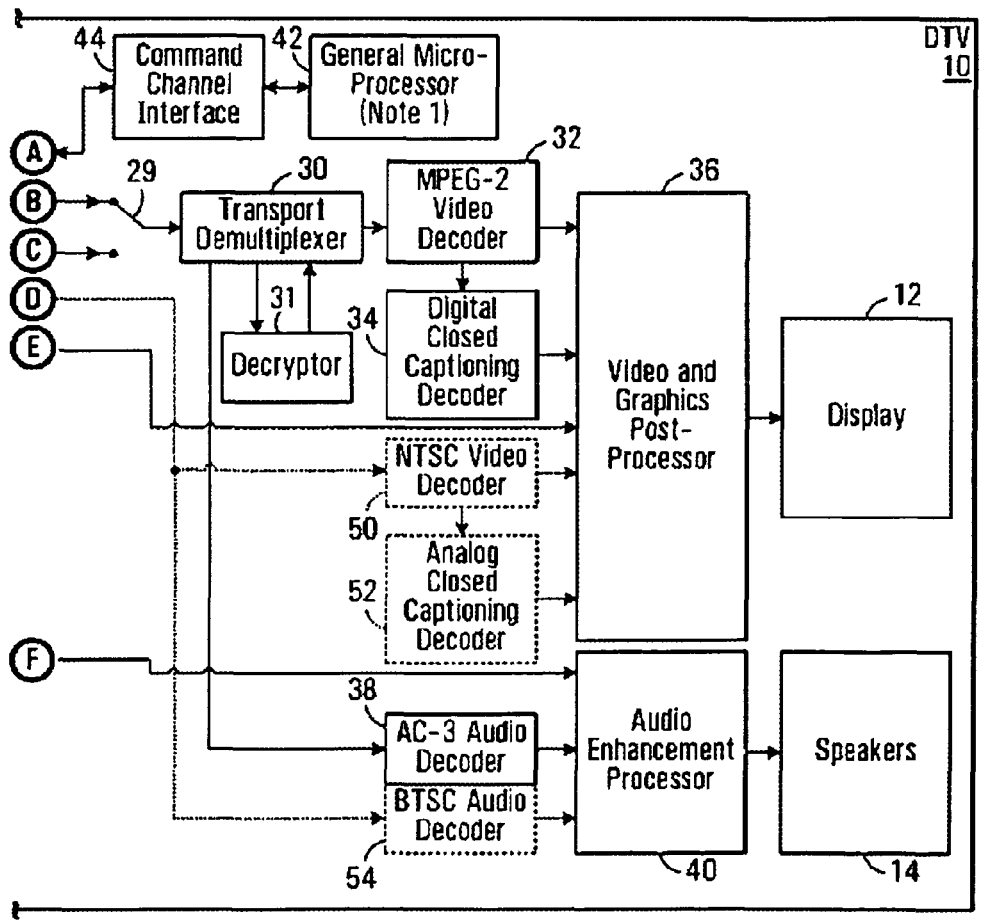

FIGS. 1A and 1B illustrate a cable-compatible digital television (DTV) 10 and interconnected new services module 100 illustrative of an embodiment of the present invention. DTV 10 is an integrated digital television unit complete with display 12 (e.g. Liquid Crystal Display (LCD) screen, plasma screen or Cathode Ray Tube (CRT)) and speakers 14, as well as other conventional components, which are described below. The DTV 10 may for example be a Sony® KDF-42WE655 digital television. DTV 10 is a form of audio/video receiver.

DTV 10 includes a HOST-POD interface 20 which conforms to the ANSI/SCTE 28 2004 HOST-POD Interface Standard. As is known in the art, the HOST-POD interface 20 is intended to provide a point of interconnection for a POD security module, such as a CableCARD™ module from Comcast®, for facilitating display on DTV 10 of digital television programs that are otherwise protected ("scrambled") by the cable provider's conditional access scrambling system. In the illustrated embodiment, however, the HOST-POD interface 20 instead serves as a point of connection for an unconventional new service module 100, illustrative of an embodiment of the present invention, through which an enterprise such as a telecommunications service provider provides new services (e.g. new programming) for display at DTV 10.

DTV 10 of FIGS. 1A and 1B is a unidirectional device, in the sense that it is capable of receiving in-band programming and out-of-band metadata (e.g. electronic program guides, entitlement management messages, emergency alert messages etc.) from a cable head-end, but is incapable of communicating commands "upstream" to the cable head-end to facilitate such interactive services as video on demand, and impulse pay-per-view as with certain contemporary digital cable television set top boxes. New services module 100 may impart such "bidirectional" capabilities to the DTV 10 for new services received at the module 100, as will be described.

As shown in FIGS. 1A and 1B, the DTV 10 contains various components, including an in-band tuner 16, a QAM demodulator 18, an out-of-band tuner 24, a Quadrature Phase Shift Keyed (QPSK) demodulator 26, a HOST-POD controller 28, a transport demultiplexer 30, an MPEG-2 video decoder 32, a closed captioning decoder 34, a video and graphics post-processor 36, an audio decoder 38, an audio enhancement processor 40, a processor 42, and a command channel interface 44, an 8-Vestigal Side Band (8-VSB) demodulator 46, an NTSC demodulator 48, an NTSC video decoder 50, an analog closed captioning decoder 52, a Broadcast Television Systems Committee (BTSC) audio decoder 54, and baseband audio/video receiver components 58.

The in-band tuner 16 (FIG. 1A) a conventional component that is responsible for isolating a 6 MHz ("major") channel of the numerous major channels which are received in the form of a modulated RF signal at DTV 10 from the cable provider's network head-end, and for converting the isolated channel to a fixed lower frequency. The term "in-band" refers to video and audio content capable of being viewed/heard by a subscriber, which the in-band tuner 16 is responsible for tuning. The identity of the major channel to be tuned is received from downstream processor 42 (described below) by way of the QPSK demodulator 26 and POD security module (also described below). The modulated RF signal which forms the input to in-band tuner 16 is received by DTV 10 at cable input 8, which may be a coaxial cable connector on the rear panel of DTV 10 for example. The output of the tuner is an analog Forward Application Transport (FAT) channel representative of the tuned major channel. In-band tuners may be implemented using a variety of discrete hardware components such as an MKT47.3 frequency trap saw filter from Murata Manufacturing Co., Ltd. and a UPC3217GV automatic gain control (AGC) amplifier from NEC Corporation for example.

QAM demodulator 18 is conventional and converts the FAT channel output by in-band tuner 16 to a baseband ANSI/SCTE 54 transport stream. Conversion is performed according to ANSI/SCTE 07 2000 (formerly DVS 031), Digital Video Transmission Standard for Television, which is available at www.scte.org/documents/pdf/ANSISCTE072000DVS031.pdf and which is hereby incorporated by reference hereinto. The output of the QAM demodulator 18 is an ANSI/SCTE 54 transport stream, which is a stream of (digital) packets. Assuming that the program which has been tuned in by the subscriber is scrambled, the ANSI/SCTE 54 transport stream output by the QAM demodulator 18 is forwarded to the HOST-POD controller 28 for de-scrambling by a conventional POD security module (not illustrated). The QAM demodulator 18 receives the identity of the tuned channel from downstream processor 42 (described below).

Out-of-band tuner 24 is a conventional component that is responsible for tuning out-of-band content from the currently tuned major channel. The term "out-of-band" indicates that the content represents information other than displayable/playable video/audio content. Out-of-band information may for example include network-specific information, electronic program guides, entitlement management messages, or even firmware updates for purposes up changing the operation of the DTV 10. Out-of-band information is usually not transmitted in the form of an ANSI/SCTE 54 transport stream, but rather is sent using cable provider-specific or proprietary mechanisms (e.g. Asynchronous Transfer Mode or other transport mechanisms). The identity of the tuned major channel is conventionally received from a downstream processor 42 (described below) by way of the QPSK demodulator 26 (also described below) and a POD security module (not illustrated). The output of out-of-band tuner 24 is a Forward Data Channel (FDC) signal representative of the tuned out of band channel.

QPSK demodulator 26 is a conventional component which demodulates the QPSK out-of-band information output by the out-of-band tuner 24. There are two possible FDC conversion processes as described in the ANSI/SCTE 55-1 2002 Standard entitled "Digital Broadband Delivery System: Out Of Band Transport Part 1: Mode A" and the ANSI/SCTE 55-2 2002 Standard entitled "Digital Broadband Delivery System: Out Of Band Transport Part 2: Mode B", which are available at www.scte.org/documents/pdf/ANSISCTE5512002DVS178.pdf and www.scte.org/documents/pdf/ANSISCTE5522002DVS167.pdf respectively, and which are each hereby incorporated by reference hereinto. The QPSK demodulator 26 receives the identity of the conversion process and the currently tuned out-of-band channel from downstream processor 42. The output of the QPSK demodulator 26 is a provider-specific protocol which is directed towards the HOST-POD interface 20.

HOST-POD controller 28 is a hardware component which serves as interface between the DTV 10 and the module connected at HOST POD interface 20. The function of HOST-POD controller is dependant upon whether the interconnected module is a POD security module or a new services module. When the interconnected module is a POD security module, HOST-POD controller 28 receives input from QAM demodulator 18, QPSK demodulator 26 and command channel interface 44 (described below) and communicates these over HOST-POD interface 20 to the POD security module for processing such as CA descrambling. However, when the interconnected module is a new services module, as illustrated in FIG. 1A, this is not done, because in that case the input to DTV 10 is received at the new services module 100 rather than at the cable input of DTV 10, and because the module 100 would be capable of descrambling the cable provider is proprietary CA scrambling system. Regardless of whether the connected module is a POD security module or new services module 100, HOST-POD controller 28 receives input over the HOST-POD interface 20 and communicates same to "back-end" components of DTV 10, such as transport demultiplexer 30 (described below), for presentation at DTV 10. HOST-POD controller 28 also communicates with HOST-POD controller 78 of new service module 100 (described below) and command channel interface 44. The HOST-POD controller operates (at least in part) at the physical layer of the Open System Interconnection (OSI) 7-layer model, in that it provides the electrical impulses for communicating over HOST-POD interface 20.

Transport demultiplexer 30 (FIG. 1B) is a component which is responsible for receiving an ANSI/SCTE 54 transport stream, filtering and de-packetizing elementary video and audio streams of the currently tuned channel based on the program identifiers (PIDs) obtained from the processor 42 (described below) and recovering the system time clock. The transport demultiplexer 30 also sends scrambled packets to decryptor 31 for descrambling and receives unscrambled packets from decryptor 31 once descrambled. Transport stream demultiplexer 30 forwards the unscrambled, filtered, depacketized elementary video stream and audio stream to an MPEG-2 video decoder 32 and audio decoder 38 (respectively).

When new services module 100 (FIG. 1A) is connected at HOST-POD interface 20, the ANSI/SCTE 54 transport stream received by the transport demultiplexer 30 originates from the new service module 100.

Decryptor 31 (FIG. 1B) is a conventional component which receives a scrambled ANSI/SCTE 54 transport stream from transport demultiplexer 30 for descrambling. Decryptor 31 may for example descramble the ANSI/SCTE 54 transport stream according to ANSI/SCTE 41 2004 POD Copy Protection System which may be found at www.scte.org/documents/pdf/ANSISCTE412004.pdf and is incorporated by reference hereinto. Decryptor 31 forwards descrambled ANSI/SCTE 54 transport stream back to transport demultiplexer 30 for further processing.

MPEG-2 video decoder 32 (FIG. 1B) is a conventional component which receives an elementary MPEG-2 video stream from transport demultiplexer 30 and decodes (decompresses) it into a format suitable for display. The output video frames/fields are communicated to video and graphics post-processor 36.

Closed captioning decoder 34 is a conventional component which extracts the digital closed captioning information embedded within the MPEG-2 video stream and forwards it to the processor 42 for decoding into graphics data. The output graphics data are communicated to video and graphics post processor 36 for blending with video frames/fields output by video decoder 32. In some embodiments, the decoder 34 may communicate data to, and receive processed data from, processor 42, which may work in conjunction with decoder 34 to achieve this decoding.

Video and graphics post-processor 36 is a conventional component which receives video frames/fields from the video decoder 32 and processes them in various ways, e.g. performs color management, de-interlacing, noise reduction and contrast control upon the images, before they are displayed as moving images on display 12. Post-processor 36 is also responsible for blending closed captioning information from closed captioning decoder 34 with the processed video images.

Audio decoder 38 is a conventional component which receives an elementary stream of AC-3 audio frames from transport demultiplexer 30 and decodes (decompresses) them into Pulse-Code Modulated (PCM) temporal audio samples. Audio decoder 38 may alternatively be an MPEG audio decoder. The decoded audio samples are output to an audio enhancement processor 40.

In some embodiments, transport demultiplexer 30, video decoder 32 and audio decoder 38 may all be components of a system-on-chip integrated circuit. For example, the system-on-chip circuit may be an ATI Technologies Inc. Xilleon™ system-on-chip device which also includes processor 42 and command channel interface 44, as well as various other components which are omitted for clarity.

Audio enhancement processor 40 is a conventional component which is capable of enhancing received temporal audio samples in various ways, e.g. by applying Dolby Virtual Speaker™ technology, surround sound technology, or by performing sample reconversion. The output digital audio signals may be forwarded to a Digital to Analog Converter (DAC) (not illustrated) or a D-class modulator (not illustrated) for purposes of conversion to analog signals, which may be played as sound by conventional speakers 14, as appropriate.

Processor 42 is a microprocessor which communicates with and controls various switches and functional blocks within the DTV 10. In the case where the ATI Xilleon™ forms part of DTV 10, for example, the processor 42 may be a 300 MHz Reduced Instruction Set Computer (RISC) architecture CPU from MIPS Technologies, Inc. When a POD security module (not illustrated) is connected to the HOST-POD interface 20 rather than new services module 100, processor 42 receives information regarding the programs on the cable network from the POD security module formatted according the ANSI/SCTE 65 service information via the HOST-POD controller 28. ANSI/SCTE 65 service information is specified in ANSI/SCTE 65 2002 (Formerly DVS 234) Service Information Delivered Out-of-Band for Digital Cable Television which is available at www.scte.org/documents/pdf/ANSISCTE652002DVS234.pdf, and which is incorporated by reference hereinto. ANSI/SCTE 65 system information encodes system information representing the currently tuned channel and the PIDs associated with the elementary streams comprising each program therein (assuming the current channel is capable of carrying multiple programs, e.g. on multiple minor channels). This information may be received from processor 74 of new service module 100 in the form of out-of-band program association tables (PATs) and program map tables (PMTs). As is known to those skilled in the art, a program association table describes the number of programs in an ANSI/SCTE 54 transport stream and provides the PIDs of the PMT for each digital television program, while the PMT provides the PIDs for each of the elementary streams comprising that program. Based on input from a DTV front panel or remote control device (not shown), processor 42 is aware of the currently tuned channel and communicates this information to the new service module 100 by way of command channel interface 44 and HOST-POD controller 28. (In cases where a POD security module is connected at HOST-POD interface 20, the information is communicated to in-band tuner 16 and QAM demodulator 18).

Command channel interface 44 is an interface which facilitates communication between processor 42 and the POD controller module 28. Where the ATI Xilleon™ system-on-chip is included within DTV 10, the interface 44 is the proprietary Flexbus interface from ATI Technologies Inc. Alternatively, this interface could be an Inter Integrated Circuit (I2C) interface, a Serial Peripheral Interface (SPI) or a Universal Serial Bus (USB) connection.

DTV 10 also includes a terrestrial broadcast tuner, including an 8-VSB demodulator 46 (FIG. 1A) and switch 29 (FIG. 1B). These components are employed when the DTV 10 is used conventionally (without a new services module 100), in order to receive certain channels which are transmitted digitally over the airwaves using the 8-VSB RF modulation format mandated by the FCC. DTV 10 also includes other components for receiving analog programming. These components, illustrated in dotted outline in FIGS. 1A and 1B, include NTSC demodulator 48 (FIG. 1A), NSTC video decoder 50 (FIG. 1B), analog closed captioning decoder 52, and BTSC audio decoder 54. These components may form part of a conventional DTV, and are not central to the present embodiment.

Baseband audio/video receiver components 58 (FIG. 1A) are a set of hardware interfaces which permit baseband audio/video signals to be received at DTV 10 from such external sources as a DVD player for example. In FIG. 1A, each arrow pointing towards box 58 represents a distinct connector, which may be on the rear panel of DTV 10 for example. The illustrated video connectors include a DVI/HDMI™ connector 59-1, a YPbPr interface (or "analog component video interface") connector 59-2, an S-Video interface connector 59-3, a Composite Video Baseband Signal (CVBS) interface connector 59-4, and audio interface connectors 59-5. Generally, video signals received over DVI/HDMI™ connector 59-1, YPbPr interface connector 59-2, S-Video interface connector 59-3 or CVBS interface connector 59-4 will be paired with a set of audio signals received over audio interface connectors 59-5. When configured as a HDMI™ interface, DVI/HDMI™ connector 59-1 could alternatively receive merged audio and video signals. The components 58 include a DVI/HDMI™ receiver, various interfaces corresponding to the above-noted connectors, components for input selection, and, for signals received in analog form, an audio analog to digital (A/D) converter and a video A/D converter. There are two outputs from components 58. The first output is video content, which is communicated to the NTSC video decoder 50 or video and graphics post-processor 36 (depending upon whether video is encoded as a NTSC video baseband signal or encoded as separate video component elements, respectively). The second output is audio content, which is communicated to the audio decoder 38 or audio enhancement processor 40 (depending upon whether audio is compressed or uncompressed, respectively). The communication of video content to NTSC decoder 50 and the communication of audio content to audio decoder 38 are not expressly illustrated in FIGS. 1A and 1B.

The components of DTV 10 to the left of dashed line L (FIG. 1A) are referred to as the "front end" components of DTV 10, while those to the right of line L, including components illustrated in FIG. 1B, are referred to as the "back end" components. As will be appreciated, the present embodiment allows new programming (or other new services) to be displayed at DTV 10, even though the new programming may be incompatible with the front end components and incapable of being received at a DVI/HDMI™ connector due to the fact that (at least) its video content is compressed. This is achieved by receiving the new programming at the new service module 100 thereby effectively circumventing the front end components of DTV 10 while still using the back end components. The new service module 100 receives the new programming in a compression format of the provider's choosing, converts it into the compression format which the back-end components of DTV 10 understand (MPEG-2 video and AC-3 audio compression in the present embodiment), and communicates the result to DTV 10 via HOST-POD interface 20. At DTV 10, the new programming is decompressed and presented using the same back end components as are used for decompressing and presenting conventional cable programming. As a result, a provider of new services may present new audio/visual content at DTV 10 without having to develop a standalone set-top box for receiving and decompressing the content and forwarding it to DTV 10 as a baseband signal via its DVI/HDMI™ connector 59-1.

Referring again to FIG. 1A, new service module 100 is a hardware device which is connected to the HOST-POD interface 20 of DTV 10 for purposes of permitting the DTV 10 to receive and present new services comprising audio and/or video content that is not received from the cable provider head-end or by conventional broadcast. As will be appreciated, the new services module 100 incorporates analogous components to the bypassed front end components of DTV 10 for purposes of receiving new services directly at the module 100. Like a conventional POD security module, the new services module 100 may be a PC card or a smart card with an embedded microprocessor for example. The physical characteristics of PC cards are set forth in the set of specifications known as the PC Card Standard which is available at www.pcmcia.org/pc03.html, and which is hereby incorporated by reference hereinto. Smart card physical characteristics are described in the set of specifications known as ISO/IEC 7816 which is available at www.iso.org/iso/en/CombinedQueryResult.CombinedQueryResult?queryString=7816, which is hereby incorporated by reference hereinto.

As illustrated, new services module 100 includes a transmitter/receiver 64, a transport demultiplexer 66, a conditional access processor 68, an audio transcoder 69, a video transcoder 70, a transport multiplexer 71, an encryptor 72, a microprocessor 74, a command channel interface 76, and a HOST-POD controller 78.

Transmitter/receiver 64 is a hardware component which is capable of receiving an RF signal carrying audio and/or video content at new services module 100. Optionally transmitter/receiver 64 is also capable of transmitting user commands "upstream" to the provider network via an RF signal, for purposes of supporting interactive program features, such as video on demand for example. Incoming signals are received at new service interface 62 before being forwarded to the transmitter/receiver 64; in the reverse direction, outbound signals from transmitter/receiver 64 are transmitted over the interface 62. The nature of the transmitter/receiver 64 and type of interface 62 may vary depending upon the type of received signal. For example, if the signal is a frequency division multiplexed asymmetric digital subscriber line (ADSL) signal carrying TCP/IP packets, the transmitter/receiver 64 may be an ADSL Transmission Unit—Remote (i.e. ADSL modem) and the interface 62 may be a standard telephone jack. Alternatively, if the signal is a wireless signal (e.g. ultra wide band or one of the IEEE 802.11 family of wireless signals), then the transmitter/receiver 64 may be a wireless network transceiver and interface 62 may be an antenna or set of antennas. In many cases the receiver circuitry of the transmitter/receiver 64 will incorporate a demodulator for separating the audio and/or video signals from an RF carrier wave, while the transmitter circuitry will incorporate a modulator for achieving the opposite in the upstream direction in respect of user commands. Transmitter/receiver 64 may similarly be an Ethernet interface, power line interfaces (such as HomePlug or the Broadband over Power Line interface), phone line interface (such as HomePNA as define in International Telecommunication Union—Telecommunication Recommendations G.9954 (ITU-T Rec. G.9954)), a coax interface (such MoCA or Coaxsys TVNet) or possibly a IEEE 1394 interface (also known as Firewire™ and i.Link™ as trademarked by Apple Computer and Sony Corporation, respectively).

The RF signal received at transmitter/receiver 64 of the present embodiment carries encapsulated audio/video content possibly representing multiple programs (e.g. multiple television shows with interspersed advertisements) which has been compressed using a chosen format. For instance, the signal may carry User Datagram Protocol over Internet Protocol (UDP/IP) packets defining a Real-Time Transport Protocol (RTP) transport stream within which compressed video data is encapsulated, in the Windows Media Video codec, Video Codec 1 (VC-1) compression format promulgated by the Society of Motion Picture and Television Engineers (SMPTE) 421M-2005 or the ISO/IEC 14496-10 format (also referred to as H.264, Advanced Video Coding (AVC) or MPEG-4 Part 10) for example. These three compression formats may be chosen because they achieve high levels of compression (i.e. have high compression ratios) compared to more conventional techniques such as MPEG-2 video compression. The motivation for highly compressing audio and video content is to maximize bandwidth utilization, in order to provide maximum content for available bandwidth. Audio may be compressed using the Meridian Lossless Packing (MLP), MPEG audio, MPEG-2 or MPEG-4 Advanced Audio Coding (AAC), or Enhanced AC-3 (EAC-3) audio standards for example. The incoming video is then re-compressed into MPEG-2 video and the incoming audio is encapsulated as Pulse Code Modulated (PCM) samples or re-compressed into AC-3 audio. The recompressed video and audio are ultimately forwarded onto DTV 10 for rendering.

A transport demultiplexer 66 (also referred to as a transport network processor) is responsible for breaking the incoming transport stream down into its constituent elements, which typically consists of audio content, video content, and "out-of-band" network information. The network information is specific to the provider network but it may for example include data that is indicative of the number of programs in the transport stream and the identity (e.g. packet identifiers) of the elementary streams representing a currently tuned channel or program. Network information could for example be carried in accordance to IEEE 1394 specifications, Digital Living Network Alliance (DLNA) guidelines, Digital Video Broadcasting (DVB) IPTV specifications, or a proprietary network specification. The transport demultiplexer 66 is further responsible for isolating or "tuning" a channel selected by a user. In the embodiment illustrated in FIG. 1A, only one channel/program may be tuned at a time. Because new service providers may scramble their content using a conditional access scrambling scheme analogous to the schemes presently used by cable providers in order to prevent unauthorized access to programming, the transport demultiplexer 66 is also responsible for forwarding the scrambled content to conditional access processor 68 for descrambling and receiving the descrambled transport stream back from the conditional access processor 68 (this functionality may be considered to be beyond the capability of a conventional demultiplexer). Once the elementary audio stream and video stream have been extracted, they are depacketized by removing the transport stream packet header and the transport stream packet payloads. The transport stream packet payloads are then forwarded to an audio transcoder 69 and a video transcoder 70, respectively (described below). As well, transport demultiplexer 66 is responsible for forwarding interactive user commands (e.g. video on demand commands such as play, stop, rewind, pause, etc.) received from processor 74 (described below) to transmitter/receiver 64 for transmission to the provider. The transport demultiplexer 66 may be capable of processing a variety of transport stream formats such as ANSI/SCTE 54 transport stream, IP transport, or IEEE 1394 transport.

Conditional access processor 68 is a component which descrambles (decrypts) the content received at module 100. This component is analogous to the conditional access descrambler component which is contained in conventional POD security modules, except that the applied conditional access descrambling technique may be a proprietary technique which is different from that used by cable providers. The descrambling techniques applied by the processor 68 may be controlled by firmware executed by the processor 68, which may be periodically upgraded for security reasons. The processor 68 may, for example, descramble the stream according to the Internet Streaming Media Alliance Cryptographic Specification Encryption and Authentication format known as ISMACryp, Secure RTP (SRTP) or a proprietary conditional access system. The output of processor 68 is an unscrambled transport stream that is then forwarded back to the transport demultiplexer 66.

Audio transcoder 69 converts audio content, received from transport demultiplexer 66 in the form of an elementary audio stream, from a first compression format in which the content was received at new services module 100 to a second compression format which is understood by the back end components of DTV 10. The compression ratio of the first format will usually be higher than that of the second format, although this is not a requirement. The incoming compression format may for example be a newer, more efficient compression format which has been adopted by the manufacturer of the new services module 100 to maximize bandwidth utilization, while the second format is an established format which is relatively stable and has thus been incorporated into commercial digital television products. Thus, for example, the audio transcoder may convert audio received in the MPEG-4 High Efficiency AAC format to AC-3.

Video transcoder 70 converts video content, received from transport demultiplexer 66 in the form of an elementary video stream, from a first compression format in which the content was received to a second compression format which is understood by the back end components of DTV 10. Again, the compression ratio of the first format will usually be higher than that of the second format, although this is not a requirement. For example, the video transcoder 70 may convert video from the ISO/IEC 14496-10 format to the MPEG-2 video format.

Transport multiplexer 71 is a component which receives transcoded (re-compressed) audio stream from audio transcoder 69 and transcoded video from video stream transcoder 70 and packetizes the streams according to the transport stream format by extracting a chunk of transcoded audio or video called the payload and prepending the payload with a transport stream packet header. The transport multiplexer 71 then time multiplexes the packets into a transport stream. The resultant transport stream may for example constitute an ANSI/SCTE 54 transport stream. As known in the art, transport multiplexing should be performed to ensure that the compressed video and audio buffers in DTV 10 do not exceed their maximum depth, to avoid video corruption. The transport multiplexer 71 also generates and inserts the proper time stamps into the transport stream, to maintain audio/video synchronization. The transport stream output from the transport multiplexer 71 is forwarded on to encryptor 72 for re-encryption, although the latter component can be bypassed via switch 73 as described below. The transport multiplexer 71 could receive network specification information from processor 74 for multiplexing with audio and video streams (not expressly illustrated).

Encryptor 72 is a component which re-encrypts the audio and video content which has been descrambled (decrypted) by the conditional access processor 68. The output of encryptor 72 may for example constitute an ANSI/SCTE 54 transport stream. The rationale for re-encrypting the program may be to prevent a subscriber from intercepting or copying content in an unencrypted form at the HOST-POD interface 20. In some embodiments, encryption may be required under government regulations which are effected to deter unauthorized access to programming. In some embodiments, switch 73, under control of processor 74 (described below), may be set on a per-channel or per-program basis, in order to selectively bypass the encryptor 72, should encryption not be required for some channels or programs. Alternatively, if encryption is not required for any channel or program, encryptor 72 may be omitted altogether, in which case switch 73 is unnecessary.

If re-encryption is in fact necessary, it may be performed by using the Data Encryption Standard (DES) for example. If DES is used, keys are exchanged between the encryptor 72 on the new services module 100 and a decryptor 31 in the DTV 10 (e.g. via the general microprocessor 74 of module 100 and the general microprocessor 42 of DTV 10) over the HOST-POD interface 20. The key exchange procedure may be as described in the ANSI/SCTE 41 2004 POD Copy Protection System Standard developed by the American National Standards Institute and the Society of Cable Telecommunications Engineers, which is hereby incorporated by reference hereinto. The key exchange procedure incorporates DFAST technology as described in U.S. Pat. No. 4,860,353, which is also incorporate by reference hereinto.

Processor 74 is a microprocessor which communicates with and controls various components within the new service module 100. Processor 74 may receive "out-of-band" network information from transport demultiplexer 66, e.g. including the number of programs in the incoming content stream, the identity of the elementary stream(s) comprising each program. Processor 74 may translate this network information into a form that is understood by DTV 10. For example, processor 74 could translate the network information to ANSI/SCTE 65 service information for carriage over the HOST-POD interface 20 via the command channel interface 76. Alternatively, processor 74 could translate the network information to ANSI/SCTE 54 transport stream and forward it to the transport multiplexer 71 for multiplexing with the audio and video streams. The processor 74 also receives information regarding the identity of the current subscriber-tuned channel in the reverse direction via command channel interface (CCI) 44. This information is relayed to the transport demultiplexer 66, and possibly transmitter/receiver 64 (e.g. as in the case where a different physical channel is to be tuned), for purposes of tuning the correct program from the transport stream received from transmitter/receiver 64. Processor 74 may also receive user commands, such as requests for video on demand or commands to play, stop, rewind or fast-forward a video-on-demand program, from DTV 10 via CCI 44. These are also relayed to the transport demultiplexer 66, in this case for transmission back to the network via transmitter/receiver 64.

Command channel interface 76 receives information regarding the currently subscriber-tuned channel from DTV 10 via HOST-POD controller 78 (described below) and relays same to the processor 74 of new services module 100 which further relays this information to the transport demultiplexer 66 (and possibly transmitter/receiver 64) for purposes of tuning the correct program from the content stream received from transmitter/receiver 64. In some embodiments, command channel interface 76 also receives network information from processor 74 for the purpose of relaying network specific information, electronic program guides and emergency alert messages to the DTV 10, e.g., in the case where this information is not embedded in the transport stream.

HOST-POD controller 78 is a hardware component which serves as interface between the new service module 100 and the DTV 10. The HOST-POD controller 78 receives an encrypted transport stream from encryptor 72 or an unencrypted transport stream from transport multiplexer 71 for communication to DTV 10. The transport stream may for example be an ANSI/SCTE 54 transport stream. HOST-POD controller 78 also receives the output of command channel interface 44 via HOST-POD controller 28 and forwards same to command channel interface 76.

It will be appreciated that some components of the DTV 10 and new service module 100 have been omitted for clarity.

Figure 2:
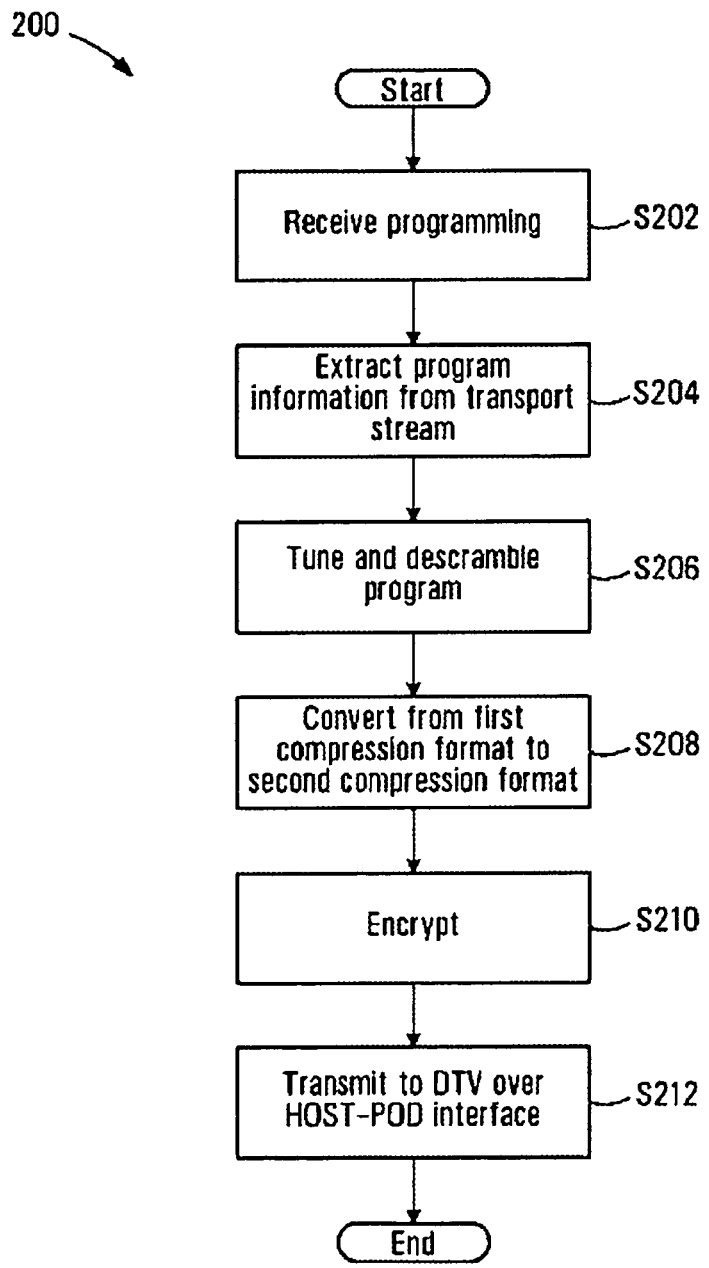
FIG. 2 illustrates operation at the new services module of FIG. 1A for receiving new services.

FIG. 2 illustrates operation 200 of the embodiment of FIGS. 1A and 1B for receiving new programming at the new services module 100 for presentation at DTV 10. Operation 200 occurs at the new services module 100.

As illustrated in FIG. 2, initially the new programming is received at transmitter/receiver 64 via interface 62 (S202). The received signal may for example be a modulated signal carrying UDP/IP packets defining an RTP transport stream in which multiple programs are compressed (e.g. video using the AVC format, audio using the EAC-3 format). The transmitter/receiver 64 may output a demodulated signal representing a stream of content representing multiple programs. Thereafter, out-of-band content information, such as the number of programs in the incoming content stream (should more than one program exist) and the identity of the elementary stream(s) comprising each program, is extracted from the content stream by transport demultiplexer 66 (S204). Using this information as well as information regarding the currently tuned channel (which is received from command channel interface 44 via POD controller 28, POD controller 78, and command channel interface 76), a program is isolated from the stream and descrambled at conditional access processor 68 (S206). The audio and video content of the descrambled program is then converted from the compression format in which it is received to another compression format which the back-end components of the DTV 10 are capable of decoding (S208). For example, the video content could be transcoded from the AVC format to the MPEG-2 format, while the audio content may be transcoded from the MPEG-4 HE AAC format to the AC-3 format. Thereafter, the converted program may be multiplexed into a transport stream such as ANSI/SCTE 54 transport stream at transport multiplexer 71. The ANSI/SCTE 54 transport stream may be encrypted, e.g., using the DES encryption algorithm, at encryptor 72, to prevent unauthorized access to the content (S210). Finally, the encrypted or unencrypted transport stream is transmitted to the DTV 10 over the HOST-POD interface 20, in the same manner as is done for conventional POD security modules (S212).

It will be appreciated that descrambling operation at S206 may not occur in some embodiments, e.g., if the new services provider chooses to transmit new programming in an unscrambled form. Moreover, operation at S210 does not necessarily occur in all embodiments.

It will be appreciated that, in order to function as described above, a commercially available DTV 10 may require some modification from its standard configurations in which all programming is expected to be received at the DTV and to be processed by the front end components. In essence, when the new services module 100 is connected and active, the DTV 10 should effectively ignore programming from the cable provider head-end. Modified DTVs may incorporate firmware for controlling the function of certain components, so as to permit the behavior of the DTV to be changed appropriately. For example, the operation of HOST-POD controller 28 may need to be changed so that it does not attempt to forward a transport stream from the front end components of DTV 10 to module 100, given that content is being received at new services module 100. New standards are due for release in the future to support this. Moreover, decryptor 31 may require updating in order to comply with new copy protection schemes employed by the new services provider.

When a subscriber changes the channel using a remote control or front panel of DTV 10 (not shown), the identity of the currently tuned channel is forwarded by processor 42 to the processor 74 of new service module 100, by way of command channel interface 44, HOST-POD controller 28, HOST-POD controller 78 and command channel interface 76. In turn, the processor 74 communicates this information to the transport demultiplexer 66, for purposes of tuning the correct program from the transport stream received from transmitter/receiver 64 at new services module 100.

Figure 3A:
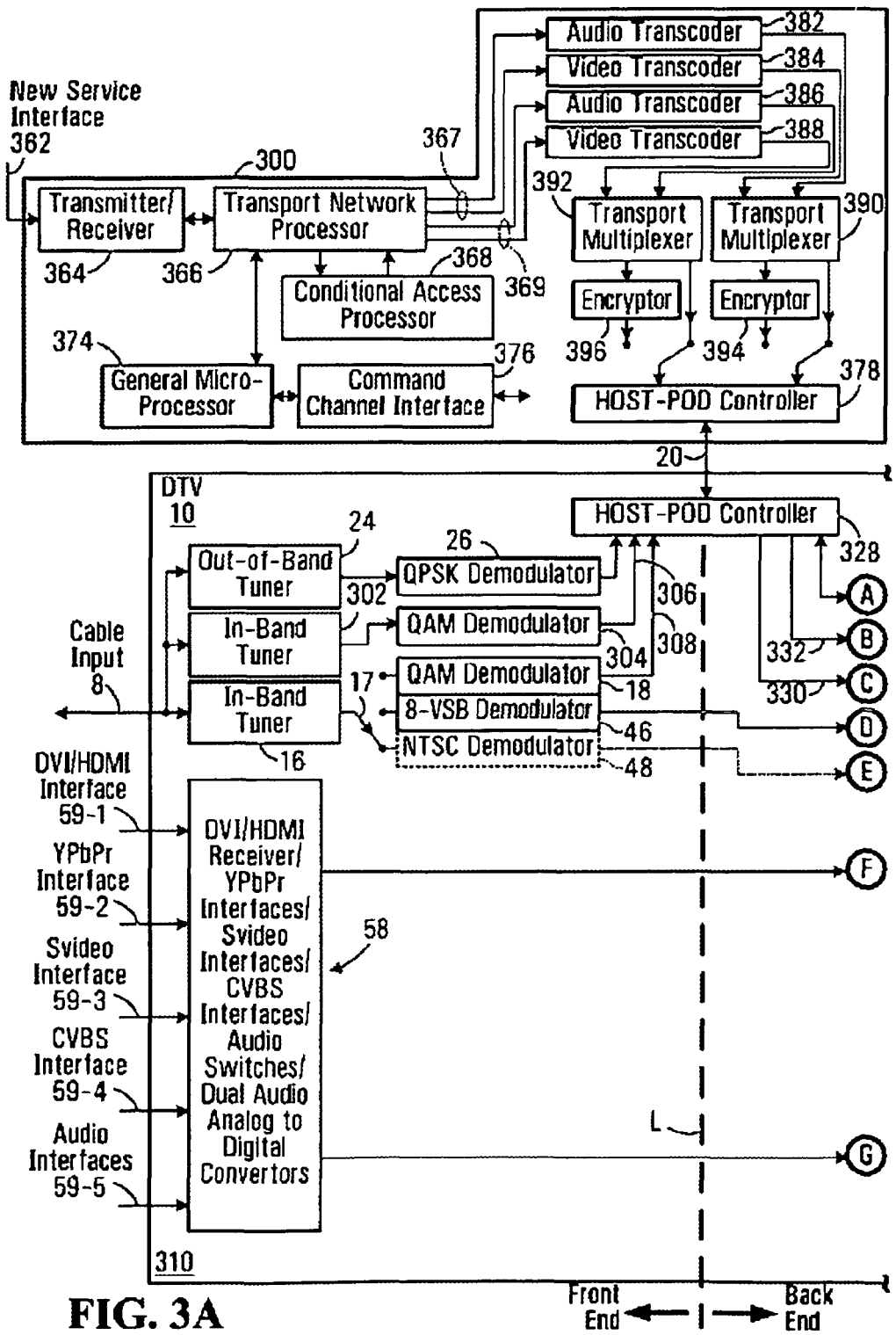
FIGS. 3A and 3B are schematic diagrams illustrating an alternative digital television and interconnected new services module configured to receive new services.
Figure 3B:
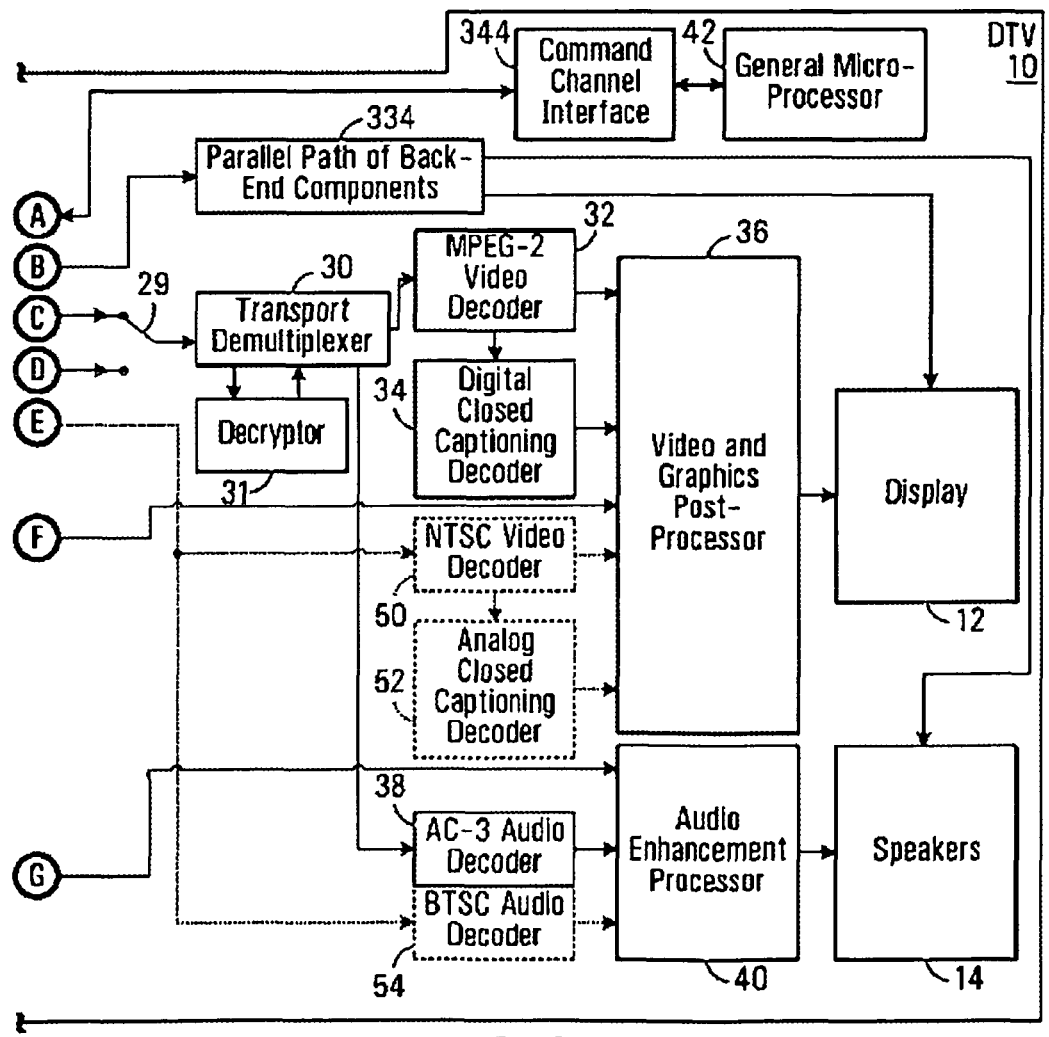

FIGS. 3A and 3B is a schematic diagram of an alternative embodiment of a new services module 300 that is capable of tuning two programs simultaneously. The module 300, which may be referred to as multi-stream new services module 300, is connected via HOST-POD interface 320 to a DTV 310 which is capable of simultaneously displaying the two tuned programs (e.g. using a picture-in-picture format). The DTV 310 may be intended to support multistream POD security modules, e.g., as described in U.S. patent application Ser. No. 09/729,523 entitled "Method of Identifying Multiple Digital Streams Within a Multiplexed Signal", which is hereby incorporated by reference hereinto. The description of FIGS. 3A and 3B will focus on the differences between those figures and FIGS. 1A and 1B, described above.

The DTV 310 is similar to DTV 10 of FIGS. 1A and 1B except that it has additional front end and back end components to permit display of a second channel which may be tuned simultaneously with a first tuned channel. Thus, the front-end components of DTV 310 include two in-band tuners, namely a first in-band tuner 16 for tuning a first channel and a second in-band tuner 302 for tuning a second channel. The identity of the tuned channels is controlled by the user of DTV 310, using a remote control device to activate a picture-in-picture feature for example. The FAT channel that is output by the second in-band tuner 302 is converted by QAM demodulator 304 to a baseband ANSI/SCTE 54 transport stream 306. The transport stream 306 is forwarded to HOST-POD controller 328. Another ANSI/SCTE 54 transport stream 308 generated by the QAM demodulator 18, which takes its input from the first in-band tuner 16, is similarly forwarded to HOST-POD controller 328.

HOST-POD controller 328 is analogous to HOST-POD controller 28 of FIG. 1A, except that it receives two ANSI/SCTE 54 transport streams from the front-end components of DTV 310, namely transport streams 306 and 308, rather than just one. As noted above, each stream 306 and 308 represents a different tuned channel. Because the HOST-POD interface 20 over which the two streams are communicated for descrambling (in the case when a conventional multistream POD module, not illustrated, is connected to the interface 20) does not have sufficient pins to support multiple transport streams, the HOST-POD controller 328 time-multiplexes the two streams into one. For example, each packet to be communicated over the HOST-POD interface 20 may be prepended with a packet which contains a Local Transport Stream ID (LTSID), e.g., a label "1" if the packet represents the first tuned channel and a label "2" if the packet represents the second tuned channel, and a local time stamp. In effect, the prepended packet indicates which channel the associated packet belongs to and when it arrived. The packets for each channel are multiplexed into a single stream and communicated over the HOST-POD interface 20. A conventional multistream POD security module understands that format, descrambles each tuned channel, and returns the result (possibly re-encrypted) over the HOST-POD interface 20. The HOST-POD controller 328 is also capable of demultiplexing the time-multiplexed stream received back from a conventional multistream POD security module (or a new services module 300 in the illustrated embodiment) into two descrambled, re-encrypted transport streams 330 and 332, using the reverse procedure to that described above. This allows new services module 300 to take advantage of the back-end components of DTV 310 which permit two channels to be displayed simultaneously.

In the back-end of DTV 310, the first and second transport streams 330 and 332 are fed into two parallel paths of components which are similar to those illustrated in the back end of DTV 10 (FIG. 1B). For example, first transport stream 330 is fed into a transport demultiplexer 30 and decryptor 31, which cumulatively filter, depacketize and decrypt elementary MPEG-2 video and AC-3 audio streams of the first currently tuned channel and recover the system time clock. The elementary video stream from transport demultiplexer 30 feeds an MPEG-2 video decoder 32, a digital closed captioning decoder 34 and a video and graphics post-processor 36, while the elementary audio stream from transport demultiplexer 30 feeds an audio decoder 38 and audio enhancement processor 40. The second transport stream 332 is fed into a parallel path of like components, which is illustrated as a single block 334 in FIG. 3B for convenience and brevity. Both paths merge at the display 12, where the video content of both channels can be presented simultaneously, and at speakers 14, where the audio content is played (although typically for only one of the channels).

Turning to the multistream new services module 300, that module includes a new services interface 362, a transmitter/receiver 364, a transport demultiplexer 366, a conditional access processor 368, two pairs of audio and video transcoders 382, 384 and 386, 388, two transport multiplexers 390 and 392, two encryptors 394 and 396, a microprocessor 374, a command channel interface 376, and a HOST-POD controller 378.

New services interface 362 and transmitter/receiver 364 are the same as new services interface 62 and transmitter/receiver 64 of FIG. 1A. New services interface 362 may expressly be an antenna and transmitter/receiver 364 may expressly be a wireless transceiver.

Transport demultiplexer 366 (also referred to as a transport network processor 366) is analogous to the transport demultiplexer 66 of FIG. 1A, with the exception that it is capable of simultaneously isolating or tuning two channels selected by a user rather than just one. Accordingly, the transport demultiplexer 66 forwards scrambled content representing two tuned channels, rather than just one channel, to conditional access processor 68 for descrambling. Moreover, the output of transport demultiplexer 366 is two pairs of constituent audio and video streams 367, 369 (each representing a tuned channel) rather than just a single constituent audio and video stream pair.

Conditional access processor 368 is analogous to the conditional access processor 68 of FIG. 1A, except that it is responsible for descrambling two channels rather than just one.

The components downstream of transport demultiplexer 366 are the same as the components downstream of transport demultiplexer 66 of FIG. 1A, except that they exist in duplicate (with the exception of the HOST-POD controller 378, which is not duplicated). This is because the transport demultiplexer 366 effectively outputs two tuned channels rather than just one as in FIG. 1A. Thus, two parallel paths are defined by the components downstream of transport demultiplexer 366 of FIG. 3A, one for each tuned channel.

In a first path, audio and video transcoder pair 382, 384 convert the audio and video content (respectively) representing a first tuned program received from the transport demultiplexer 366 from a first compression format in which the content was received at new services module 300 to a second compression format which is understood by the back end components of DTV 310. The compression ratio of the first format will usually be higher than that of the second format (although this is not a requirement). For example, the video transcoder 384 may convert video from the ISO/IEC 14496-10 format to the MPEG-2 video format, while the audio transcoder 382 may convert audio received in the MPEG-4 High Efficiency AAC format to AC-3.

Transport multiplexer 390 (analogous to transport multiplexer 71 of FIG. 1A) receives re-compressed audio stream from audio transcoder 382 and re-compressed video stream from video transcoder 384 and packetizes the streams according to a transport stream format by extracting a chunk of transcoded audio or video called the payload and prepending the payload with a transport stream packet header. Transport multiplexer 390 then time multiplexes the packets into a transport stream such as an ANSI/SCTE 54 transport stream. The transport stream output from the transport multiplexer 390 is either forwarded to encryptor 394 for re-encryption or is forwarded directly to HOST-POD controller 378. The transport multiplexer 390 could receive network specification information from processor 374 for multiplexing with audio and video streams (not expressly illustrated).

Encryptor 394 is a component which optionally re-encrypts the program which has been descrambled (decrypted) by the conditional access processor 368. The re-encrypted program may for example constitute an ANSI/SCTE 54 transport stream. The copy protection specification to which encryptor 394 performs its encryption may differ from that to which encryptor 72 (FIG. 1A) performs encryption.

In FIG. 3A, a second path from transport demultiplexer 366, parallel and analogous to the first path described above, is comprised of audio and video transcoder pair 386, 388, transport multiplexer 392, and encryptor 396. These components are similarly configured to the audio and video transcoder pair 382, 384, transport multiplexer 390, and encryptor 394 of the first path. As will be described, the streams carried by these two paths are time-multiplexed by the HOST-POD controller 378 for communication over the HOST-POD interface 20.

Processor 374 (analogous to processor 74 of FIG. 1A) is a microprocessor which communicates with and controls various components within the new service module 300. Processor 374 may receive out-of-band network information from transport demultiplexer 366, e.g. including the number of programs in the incoming content stream, the identity of the elementary streams comprising each program. The networking information is specific to the provider network. Processor 374 may translate this network information system information into a form that is understood by DTV 10. For example, processor 74 could translate the network information to ANSI/SCTE 65 service information for carriage over the HOST-POD interface 20 via the command channel interface 76. Alternatively, processor 74 could translate the network information to ANSI/SCTE 54 transport stream and forward it to the transport multiplexer 71 for multiplexing with the audio and video streams. The processor 374 also receives information regarding the identity of the two current subscriber-tuned channels in the reverse direction via command channel interface (CCI) 344. This information is relayed to the transport demultiplexer 366, and possibly transmitter/receiver 364 (e.g. as in the case where a different physical channel is to be tuned), for purposes of tuning the correct program from the content stream received from transmitter/receiver 364. Processor 374 may also receive user commands, such as video on demand commands, from DTV 310 via CCI 344. These are also relayed to the transport demultiplexer 366, in this case for transmission back to the network via transmitter/receiver 364.

Command channel interface 376 (analogous to command channel interface 76 of FIG. 1A) receives information regarding the two currently subscriber-tuned channels from DTV 310 via HOST-POD controller 378 (described below) and relays same to the processor 374 of new services module 300 which further relays this information to the transport demultiplexer 366 (and possibly transmitter/receiver 364) for purposes of tuning the correct channels/programs from the content stream received from transmitter/receiver 364. In some embodiments, command channel interface 376 also receives network information from processor 374 for the purpose of relaying network specific information, electronic program guides and emergency alert messages to the DTV 310, e.g., in the case where this information is not embedded in the transport stream.

HOST-POD controller 378 is analogous to HOST-POD controller 78 of FIG. 1A, except that it receives two encrypted ANSI/SCTE 54 transport streams, each representing a different tuned channel, from transport multiplexers 390 and 392 directly or from encryptors 394 and 396. The HOST-POD controller 378 time-multiplexes the two streams into one, using the same approach as HOST-POD controller 328 of DTV 310, and the resultant stream is communicated over the HOST-POD interface 20 to DTV 310 for de-multiplexing into the component transport streams by HOST-POD controller 328.

Operation of the new services module 300 of FIGS. 3A and 3B is largely the same as the operation 200 of the embodiment of FIGS. 1A and 1B shown in FIG. 2, except that operation at S204, S206, S208, and S210 is performed for each of the two tuned channels. Moreover, the transmitting in S212 is understood to be a transmission of the time-multiplexed transport stream (representing both descrambled and possibly re-encrypted tuned channels) that is generated by the HOST-POD controller 378. That is, a "multiplex" operation is effectively inserted between S210 and S212.

In some embodiments, a single transport multiplexer component may achieve the function of the two transport multiplexers 390 and 392, and a single encryptor may achieve the function of the two encryptors 394 and 396.

In some embodiments, the number of channels capable of being tuned at the new services module exceeds two.

It is noted that use of a new services module such as module 10 (or module 310) is not limited to unidirectional DTVs. A new services module could also be used to provide new programming to a bidirectional DTV. In addition to the DTV components illustrated in FIGS. 1A and 1B, a bidirectional DTV would include components which permit the DTV to communicate commands "upstream" to the cable provider head-end to facilitate such interactive services as video on demand. These components may for example include a diplexer at the cable input for filtering RF signals, an in-band tuner, a QAM demodulator, and an embedded cable modem (all connected in series) for receiving interactive services, as well as a QAM/QPSK/SCDMA (Synchronous Code Division Multiple Access) modulator and return channel transmitter for return path communications. The conventional operation of these components will be apparent to a person skilled in the art. Notably, a bidirectional DTV may require modification (e.g. firmware upgrade) from its conventional form so that no attempt is made to communicate "upstream" to the cable provider head-end when programming or other new services are being received at new services module.

As will be appreciated by those skilled in the art, modifications to the above-described embodiments can be made without departing from the essence of the invention. For example, in an alternative embodiment, the new services module 100 may not be bidirectional, i.e., may not be capable of communicating commands "upstream" to the new services provider. In this case, transmitter/receiver 64 may simply be a receiver.

The transport stream received at the new services module may comprise just video content or just audio content (rather than audio and video together).

The signal received at the new services module is in many cases an RF signal, however this is not a requirement. For example, it is conceivable that the signal could be light carried by an optical fiber.

A new services provider may alternatively provide new services such as interactive and non-interactive games where by the new services module renders the games images and encodes them the MPEG-2 video and AC-3 audio.

Other modifications will be apparent to those skilled in the art and, therefore, the invention is defined in the claims.

What is claimed is:

1. A system comprising:
  a module coupled to a media device, said module comprising:
    a receiver configured to receive a signal carrying audio content in a first audio compression format and video content in a first video compression format via a service interface of said module, wherein a tuning scheme of said signal is incompatible with a front end tuner of said media device;
    a controller configured to transmit said audio content in a second audio compression format and said video content in a second video compression format to a processor in a back end of said media device via a HOST-POD interface of said module, bypassing said front end tuner of said media device; and
    a command channel interface configured to communicate control information between said receiver and said media device.

2. The system of claim 1, wherein at least one of said audio content or said video content is encrypted, and said module further comprises a conditional access processor configured to decrypt at least one of said audio content or said video content.

3. The system of claim 1, wherein said module further comprises an encryptor configured to encrypt at least one of said audio content in said second audio compression format or said video content in said second video compression format.

4. The system of claim 1, wherein said module is embodied as one of a PC card or a smart card.

5. The system of claim 1, wherein said first audio and video compression formats have a higher compression ratio than said second audio and video compression formats.

6. The module of claim 1, wherein each of said first audio compression format and said first video compression format is one of Video Codec 1 (VC-1), Advanced Video Coding (AV), or Moving Pictures Expert Group (MPEG) compression formats, and each of said second audio compression format and said second video compression format is another one of said Video Codec 1 (VC-1), Advanced Video Coding (AV), or MPEG compression formats.

7. The system of claim 1, wherein:
  said front end tuner of said media device is configured to demodulate using a tuning scheme for a first provider; and
  said receiver of said module is configured to demodulate said signal carrying said audio content and said video content using a tuning scheme for a second provider different than said tuning scheme for said first provider.

8. The system of claim 1, wherein said module further comprises a transmitter configured to communicate commands for interactive services upstream to a service provider head end via said service interface.

9. A digital audio/video receiver, comprising:
  a media device, comprising:
    a tuner configured to receive a broadcast signal; and
    a HOST-POD interface; and
  a module coupled to said HOST-POD interface, said module comprising:
    a receiver configured to receive a signal carrying audio content in a first audio compression format and video content in a first video compression format via a service interface of said module, wherein said signal is incompatible with said tuner of said media device;
    a controller configured to transmit said audio content in a second audio compression format and said video content in a second audio and video compression format to a processor in a back end of said media device via a HOST-POD interface of said module, bypassing said tuner of said media device; and
    a command channel interface configured to communicate control information between said receiver and said media device.

10. The digital audio/video receiver of claim 9, wherein said tuner is configured to tune to a first channel, and said media device further comprises a second tuner configured to tune to a second channel on a cable television network or terrestrial broadcast signal.

11. The digital audio/video receiver of claim 9, wherein said digital audio/video receiver is a digital television.

12. The digital audio/video receiver of claim 9, wherein each of said first audio compression format and said first video compression format is one of Video Codec 1 (VC-1), Advanced Video Coding (AV), or Moving Pictures Expert Group (MPEG) compression formats, and each of said second audio compression format and said second video compression format is another one of said Video Codec 1 (VC-1), Advanced Video Coding (AV), or MPEG compression formats.

13. A method, comprising:
  in a module coupled to a media device:
  receiving, by a receiver, audio content in a first audio compression format and video content in a first video compression format via a service interface of said module, wherein said receiver is configured to receive a signal incompatible with a front end tuner of said media device;
  transmitting said audio content in a second audio compression format and said video content in a second video compression format to a processor in a back end of said media device via a HOST-POD interface of said module, bypassing said front end tuner of said media device; and
  communicating control information between said receiver and said media device using a command channel interface.

14. The method of claim 13, wherein each of said first audio compression format and said first video compression format is one of Video Codec 1 (VC-1), Advanced Video Coding (AV), or Moving Pictures Expert Group (MPEG) compression formats, and each of said second audio compression format and said second video compression format is another one of said Video Codec 1 (VC-1), Advanced Video Coding (AV), or MPEG compression formats.

15. A module coupled to a digital audio/video receiver, comprising:
  a receiver for receiving a signal carrying audio content in a first audio compression format and video content in a first video compression format via a service interface of said module, wherein said signal is incompatible with a front end tuner of said digital audio/video receiver;
  a demultiplexer for separating said audio content from said video content;
  a multiplexer for multiplexing said audio content in a second audio compression format and said video content in a second video compression format, said multiplexing resulting in a multiplexed stream;
  a controller for transmitting said multiplexed stream to a processor in a back end of said audio/video receiver via a HOST-POD interface of said module, bypassing said front end tuner of said digital audio/video receiver; and
  a command channel interface for communicating control information between said receiver and said digital audio/video receiver.

16. The module of claim 15, wherein said demultiplexer is additionally for depacketizing said audio content in said first audio compression format and said video content in said first video compression format, and said multiplexer is additionally for packetizing said audio content in said second audio compression format and said video content in said second video compression format.

17. The module of claim 15, wherein at least one of said audio content or said video content is encrypted, and said module further comprises a conditional access processor for decrypting at least one of said audio content or said video content.

18. The module of claim 15, further comprising an encryptor for encrypting said multiplexed stream.

19. The module of claim 15, wherein said digital audio/video receiver is a digital television.

20. The module of claim 15, embodied as a PC card or smart card.

21. The module of claim 15, wherein said signal is an RF signal.

22. The module of claim 15, wherein:
said audio content and said video content represent a first program;
said signal further carries additional audio content in said first audio compression format and additional video content in said first video compression format, said additional audio content and said additional video content representing a second program; and
said module further comprises:
a second demultiplexer for separating said additional audio content from said additional video content;
a second audio transcoder for converting said additional audio content from said first audio compression format to said second audio compression format;
a second video transcoder for converting said additional video content from said first video compression format to said second video compression format; and
a second multiplexer for multiplexing said additional audio content in said second audio compression format and said additional video content in said second video compression format, said multiplexing resulting in a second multiplexed stream, wherein
said controller is also for transmitting said second multiplexed stream to said processor in said back end of said audio/video receiver via said HOST-POD interface of said module.

23. The module of claim 22, wherein said controller is also for multiplexing said multiplexed stream and said second multiplexed stream prior to transmitting said multiplexed stream and said second multiplexed stream.

24. The module of claim 22, wherein said second demultiplexer is additionally for depacketizing said additional audio content in said first audio compression format and said additional video content in said first video compression format, and said multiplexer is additionally for packetizing said additional audio content in said second audio compression format and said additional video content in said second video compression format.

25. The module of claim 15, wherein each of said first audio compression format and said first video compression format is one of Video Codec 1 (VC-1), Advanced Video Coding (AV), or Moving Pictures Expert Group (MPEG) compression formats, and each of said second audio compression format and said second video compression format is another one of said Video Codec 1 (VC-1), Advanced Video Coding (AV), or MPEG compression formats.

* * * * *